US012313126B2

(12) United States Patent
Heitbaum et al.

(10) Patent No.: US 12,313,126 B2
(45) Date of Patent: May 27, 2025

(54) CLUTCH WITH A PISTON THAT CAN BE ACTED UPON FROM BOTH SIDES, AND STOP PLATE

(71) Applicant: Schaeffler Technologies AG & Co. KG, Herzogenaurach (DE)

(72) Inventors: Markus Heitbaum, Bühlertal (DE); Viktor Lichtenwald, Fürth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/715,772

(22) PCT Filed: Nov. 16, 2022

(86) PCT No.: PCT/DE2022/100859
§ 371 (c)(1),
(2) Date: Jun. 3, 2024

(87) PCT Pub. No.: WO2023/110006
PCT Pub. Date: Jun. 22, 2023

(65) Prior Publication Data
US 2025/0020174 A1 Jan. 16, 2025

(30) Foreign Application Priority Data
Dec. 13, 2021 (DE) .................... 10 2021 132 819.5

(51) Int. Cl.
*F16D 11/10* (2006.01)
*F16D 11/00* (2006.01)

(52) U.S. Cl.
CPC .............. *F16D 11/10* (2013.01); *F16D 11/00* (2013.01); *F16D 2011/002* (2013.01)

(58) Field of Classification Search
CPC .......... F16D 11/00; F16D 11/10; F16D 11/14; F16D 2011/002; F16D 2011/006
See application file for complete search history.

(56) References Cited

U.S. PATENT DOCUMENTS

| 3,071,224 | A |   | 1/1963  | Crankshaw |           |
|-----------|---|---|---------|-----------|-----------|
| 4,549,449 | A | * | 10/1985 | Miller    | F16H 3/54 |
|           |   |   |         |           | 475/303   |
| 5,123,513 | A | * | 6/1992  | Petrak    | F16D 11/10 |
|           |   |   |         |           | 192/85.33 |
| 2013/0334001 | A1 | * | 12/2013 | Albrecht | F16D 11/04 |
|           |   |   |         |           | 192/69.7  |

(Continued)

FOREIGN PATENT DOCUMENTS

| DE | 102014213884 A1 | 2/2015 |
| DE | 102017207136 A1 | 12/2017 |
| DE | 102021101141 A1 | 7/2022 |

(Continued)

*Primary Examiner* — Timothy Hannon (57) ABSTRACT

A clutch for selectively coupling a motor to a motor vehicle drive train includes a housing, a shift sleeve, an actuating bell arranged to move the shift sleeve, a piston and a stop disc. The housing includes a first pressure chamber and a second pressure chamber. The piston is connected to the actuating bell and arranged in a pressure-dependent axially movable manner between the first pressure chamber and the second pressure chamber. The stop disc is arranged in the first pressure chamber or in the second pressure chamber for limiting axial mobility of the piston.

17 Claims, 6 Drawing Sheets

(56) References Cited

U.S. PATENT DOCUMENTS

2015/0083540 A1\* 3/2015 Sumek .................. F16D 25/061
                                                      192/85.01
2017/0363178 A1 12/2017 Rekow

FOREIGN PATENT DOCUMENTS

| DE | 102021132822 B3 | 11/2022 |
| DE | 102021132824 B3 | 12/2022 |
| DE | 102021132821 B3 | 1/2023 |
| JP | H04203626 A | 7/1992 |

\* cited by examiner

CLUTCH WITH A PISTON THAT CAN BE ACTED UPON FROM BOTH SIDES, AND STOP PLATE

CROSS-REFERENCE TO RELATED APPLICATIONS

This application is the United States National Phase of PCT Appln. No. PCT/DE2022/100859 filed Nov. 16, 2022, which claims priority to German Application No. DE102021132819.5 filed Dec. 13, 2021, the entire disclosures of which are incorporated by reference herein.

TECHNICAL FIELD

The present disclosure relates to a clutch for coupling and decoupling an engine from a motor vehicle drive train. The clutch includes a piston which is arranged in a housing having, for example, pressure connections between two pressure chambers each connected to one of the pressure connections so as to be axially displaceable due to pressure. The piston is connected to, for example, a separate or integral actuating bell in a materially bonded, form-fitting and/or force-fitting or one-piece manner, which is prepared for contacting/moving a sliding sleeve.

BACKGROUND

Decoupling devices for separating an engine from a drive train are already known from the prior art. For example, DE 10 2021 101 141 A1 discloses such a decoupling device, which can also be referred to as a clutch.

This older prior art relates to a decoupling device for separating a motor from a drive train which has a piston which is movably mounted in a housing parallel to a longitudinal axis L of the housing and which has an arm for directly or indirectly actuating a coupling element. A first region of the piston is operatively connected to a first pressure space such that when pressure is applied to the first pressure space, the piston is moved in a first direction parallel to the longitudinal axis L, and a second pressure space is provided which is operatively connected to a second region of the piston such that when pressure is applied to the second pressure space, the piston is moved in a second direction parallel to the longitudinal axis L, said second direction being opposite the first direction. The present disclosure also relates to such an object, which is to be considered as included here.

In this earlier patent application, it has been emphasized that the first region is located at a first longitudinal end of the piston and the second region is formed by a recess in a lateral surface of the piston and that the recess is formed on an outer half of the lateral surface of the piston, viewed radially with respect to the longitudinal axis L. Furthermore, it has been found to be expedient that each of the pressure spaces is equipped with a pressure connection. In addition, the piston should be formed as an annular piston which extends about the longitudinal axis L.

Furthermore, the older patent application—which is to be considered as included as disclosed here with regard to the functional and effective relationships as well as the geometry—contains a first ball located radially inside the piston and on which the arm of the piston is mounted. Thus, a claw should be provided, on which the first ball bearing rests radially on the inside and which is designed to actuate the clutch element with a free end. A second ball bearing may be included, on which the housing is supported radially outward.

Similar devices are also known from DE 10 2014 213 884 A1 and JP H04 203 626 A.

SUMMARY

The present disclosure provides a generic clutch including a stop disc/baffle disc arranged in a pressure chamber, e.g., separate from the housing and the piston, which limits an axial movement of the piston at least in one axial direction. In this way, variable pressure spaces/pressure chambers and pressure connections for interacting pistons are implemented. The disclosure focuses on two variants for implementing variable pressure spaces for interacting pistons.

The present disclosure thus discloses a system that works for bilaterally actuated/interacting pistons. The new concept focuses on developing two variable pressure spaces using a baffle disc and a variable pressure connection using a pressure space sleeve for implementation within one housing. In order to return the claw clutches to the open state when they are closed, a baffle disc is arranged behind a second seal and the design of the pressure space is changed.

In a first variant, a housing design is shown which contains a piston that can be actuated in two directions. The piston is inserted into the housing with two seals like a standard hydraulic clutch slave cylinder. The first pressure chamber and the pressure connection are located next to, for example, the right side of the annular piston and provide a pre-stroke. A second pressure chamber is then located, for example, to the left of a taper of the annular piston. This second pressure chamber is made possible by inserting a baffle disc with a third seal into the housing and securing it with a circlip. It has a second pressure connection which moves the piston back to the left when pressure is applied, thus forming the return stroke. In some designs, however, the piston must be made in two parts for assembly.

In some example embodiments, the second pressure chamber is moved inwards, to the underside of the piston. In order to accommodate a pressure connection in a confined space on the inside of the housing, a pressure space sleeve is used. This is equipped with an annular groove and two O-rings on the sides and is fixed in the housing with a circlip. Two holes within the ring groove ensure the flow of the operating medium.

In general, it should be understood that the piston should be guided and centered via a sliding band. The baffle disc is sealed to the housing with an O-ring. The end stop when the claw is open is realized via additional webs on the baffle disc. In both variants, a sensor travel measurement is provided. An X-sealing ring can be used because it is pressurized from both sides (alternately) (pressure chamber 1 and 2).

The disclosed device is suitable for a front-wheel electric axle and a hydraulic actuation of the coupling/decoupling unit, e.g., when using a claw clutch.

The stop disc may seal the pressure chamber directly/indirectly.

It has proven to be effective if a seal is inserted in at least one seat of the stop disc or if a seal is inserted in each of two seats of the stop disc.

A seal, e.g., an O-ring or oil seal, may be arranged between the housing and the stop disc and/or a seal may be arranged between the stop disc and the piston.

In an example embodiment, the stop disc is arranged radially inside or radially outside the piston.

It has proven to be useful if the piston is prepared for double-sided/alternative pressurization and/or the stop disc has at least one axial projection which is designed to strike the piston and penetrate one of the pressure chambers and/or a plurality of axial projections protrude from an end face of the stop disc distributed over the circumference and/or a circlip fixed in the housing at least fixes the axial position of the stop disc.

The stop disc may be arranged radially inside or radially outside the piston. The radially inner arrangement may be advantageous, since the piston can be formed as one piece with the actuating bell. Better use of installation space, e.g., smaller-scale use of installation space, may possibly be achieved with a radially outer arrangement. However, this could have disadvantages during installation.

It has proven to be effective if a seal is inserted in at least one seat of the stop disc or if a seal is inserted in each of two seats of the stop disc. It is possible to use injection molding or vulcanization.

If the piston is prepared for bilateral/alternating pressurization, actuation in one axial direction and the opposite axial direction is possible in a small installation space.

It has also proven to be effective if the stop disc has at least one axial projection which is designed to strike the axial piston and penetrate one of the pressure chambers. This then results in the targeted design and use of space.

If a large number of axial projections protrude from an end face of the stop disc distributed over the circumference, jamming of the piston/ring piston within the housing can be effectively prevented. For example, an evenly distributed arrangement of the axial projections is desirable in this regard.

In an example embodiment, a circlip fixed in the housing at least the axial position of the stop disc, for example together with a step of the housing, is fixed.

The sliding sleeve may be connected to the actuating bell. This can also simplify assembly. This connection can be permanent or temporary.

Furthermore, an end stop disc may be designed to be elastic in the axial direction is provided to limit the axial movement of the sliding sleeve/shift sleeve.

It is expedient if the end stop disc has an S-shape or double S-shape in the longitudinal section along the axis of rotation of the clutch.

The end stop disc may be mounted pre-tensioned.

It is also expedient if the end stop disc is attached to a shaft, for example an intermediate shaft.

In an example embodiment, the end stop disc is mounted with preload force between a clutch body prepared for torque connection with the sliding sleeve and a shaft-fixed retaining ring.

It has proven to be effective if the radial extension of the end stop disc is larger than that of the clutch body.

There may be an empty space between the end stop disc and the clutch body.

The retaining ring may be arranged in a groove on the outer surface of the shaft in an axially defined position.

In an example embodiment, the end stop disc is designed to be at least ten times (at most 100 times) more elastic in the axial direction, i.e., the retaining ring and/or the clutch body.

At least one mechanical locking element between an axially movable component and an axially fixed component may be designed and arranged in such a way that the sliding sleeve can be/is locked in two different axial positions, depending on the operating state.

The locking element may be arranged in the (axially) movable component, namely the shift sleeve or the piston on the one hand, and the axially fixed component, namely an idler gear or the housing on the other hand.

It is expedient if the locking element is arranged in a spring-loaded seat in the axially fixed (or axially movable) component in order to selectively engage between two grooves in the axially movable (or axially fixed) component in a locking manner.

It has proven to be effective if the grooves form a recess that is beveled on both sides.

It is useful if a locking/stopping is forced when the locking element engages in one of the two grooves.

In order to distribute the forces particularly well, it has proven useful to use a large number of locking elements.

It is desirable if at least one of the locking elements/the locking element is shaped as a sphere or ball.

In an example embodiment, two detents, each with a locking element, are present at the same radial distance from a rotation axis of the clutch.

It is useful if the grooves are in a hardened insert.

The actuating bell may have a portion which is designed as a cantilever-like arm and has a snap closure at a free end for engaging the sliding sleeve.

The cantilever-like arm projecting from a main body of the actuating bell may be spaced apart by a slit/recess extending between the cantilever-like arm and the main body, by means of which the elasticity/rigidity in the axial direction and radial direction may be specifically adjusted. The cantilever-like arm is therefore separated from the main body (mostly but not completely) via the slit. The extension allows the elasticity/stiffness to be specifically adjusted in both the axial and radial directions.

It has proven to be effective if the slit extends only partially through the material of the actuating bell in the circumferential direction, but completely through the material in the radial direction.

It is also beneficial if there is a slot in the cantilever-like arm. A precise adjustment of the stiffness/elasticity can then be made.

If the slot runs parallel to the slit and preferably has the same axial width, manufacturing is simplified.

The cantilever-like arm may define a lever. The preset will then be easier.

If the snap closure with axial clearance surrounds a radial projection of the sliding sleeve, assembly becomes easier.

It is useful if the slot is designed as a rectangular through-opening.

In an example embodiment, the cantilever-like arm may be designed to be L-shaped or Z-shaped.

Thanks to the hydraulic actuation, the end stops of the shifting piston are now easier to control. This means that there is no longer unacceptable NVH disturbance between the sliding sleeve and a clutch body. An S-disc is used as an end stop between the locking ring and the clutch body. The S-disc can be designed to be elastic especially for the application and thus reduce the noise at the end stop. The S-disc can be mounted between the clutch body and the locking ring with appropriate preload. Especially for electric front axles and dual drive electric axles, an improved disconnect unit with hydraulic actuation is now possible.

Although concepts with multi-plate clutches are known on the market, they are now being improved: While the plates were previously constantly preloaded with shifting pistons and the end stops in multi-plate clutches were the plates themselves, an improved variant is now possible. Due to the current requirement, the dog clutch with a form fit is shifted instead of a multi-plate clutch. However, end stop shifting noises are avoided. Due to the hydraulic actuation, the end stop points of the shifting piston are still not easy to control, but unacceptable noises are avoided. Hard end stops between the clutch body and the sliding sleeve are avoided. Currently known end stops, which rely on a form fit, for example by using "humps" on the clutch body, or rely on a form fit, for example by means of three end stops on the sliding sleeve itself, are now unnecessary. For the disclosed device, an S-disc is used as an end stop between the locking ring and the clutch body. The S-disc can be designed to be elastic, especially for the application, which reduces the noise at the end stop. The S-disc can be mounted between the clutch body and the retaining rings with appropriate preload.

Ultimately, a DCU/disconnect unit for electric axles with hydraulic actuation, having locking elements, is at the heart of this disclosure. The disclosed device now achieves an improvement. Due to the residual, unwanted pressures in the shifting piston (connection P1 or P2) from the hydraulic system, an unusual movement of the shifting piston occurs in the pressure chambers P1 and P2 due to the form-fitting connection of the shifting piston with the sliding sleeve, and additionally the movement of the sliding sleeve. Such unwanted movements are highly critical in terms of both function and functional safety (e.g., breakage of the gearing, uncontrolled driving of the vehicle). In the hydraulic system it can be implemented with additional effort or in the pressure valves it is complex by using complex, additional valves. This is no longer necessary. At the same time, due to the complex hydraulic valves, the controllability and positioning of the shifting piston was also not robust. Here too, an improvement is achieved.

The use of locking elements in/with moving parts leads to improvements in DCUs. A locking element between the shifting cylinder and the shifting piston as the one locking element, for example as a slotted wire ring, formed wire ring or like a pressure piece with a spiral spring, is effective. At the same time, it is also useful to use a locking element between the sliding sleeve and the idler gear. The object of both locking elements is to avoid the unusual axial movement of the shifting piston, which is achieved. The axial force is distributed between both locking elements and at the same time the end positions of the sliding sleeve and the shifting piston are ensured. To minimize friction, the axial clearances between the sliding sleeve and the shifting piston are guaranteed.

An improved disconnect unit with hydraulic actuation is now being introduced, especially for front axles and dual drive E-axles. Due to current findings and new concepts with a form fit (not a friction fit), solutions of this type are still unknown.

The present disclosure thus also relates to a DCU/disconnect unit for electric axles, having a shifting crown with two functions. Concepts with multi-plate clutches are well known on the market. Until now, the plates were constantly pre-tensioned using shifting pistons. In the multi-plate clutch, the soft end stop was the disc itself. Due to the current requirement, the torque clutch with a form fit is shifted instead of a multi-plate clutch. This causes shifting noises when engaging (tooth-on-tooth position), which are now avoided. Due to the hydraulic actuation, the tooth-on-tooth position of the shifting piston/shifting crown cannot easily be controlled with the appropriate speed and force. This is still the case, but the previously unacceptable NVH disturbances are avoided. These would otherwise occur between the sliding sleeve/shift sleeve and the clutch body. Known solutions were with synchronization and a shift fork with corresponding rigidity. In addition, the shifting crown/shifting piston with the sliding sleeve also had to be assembled. This is now all avoided and the axial stiffness is provided. Assembly is simplified. The hard end stop in the tooth-on-tooth position between the clutch body and the sliding sleeve is reduced.

A robust assembly is achieved with the help of the snap connection to the sliding sleeve. The solution uses the special design of the shifting crown, which simultaneously takes into account the assembly and the axial rigidity. The shifting crown has a special arm design for mounting and rigidity. With the lever for radial rigidity it is possible to realize the snap closure on the groove in the shifting crown/the shifting piston to the web on the sliding sleeve. The lever for the axial stiffness also makes it possible to easily adjust the axial stiffness.

BRIEF DESCRIPTION OF THE DRAWINGS

The present disclosure is explained in more detail below with the aid of drawings. In the figures.

DETAILED DESCRIPTION

The figures are only schematic in nature and serve only for understanding of the disclosure. Identical elements are provided with the same reference symbols. Features of the individual embodiments can be interchanged.

Figure 1:
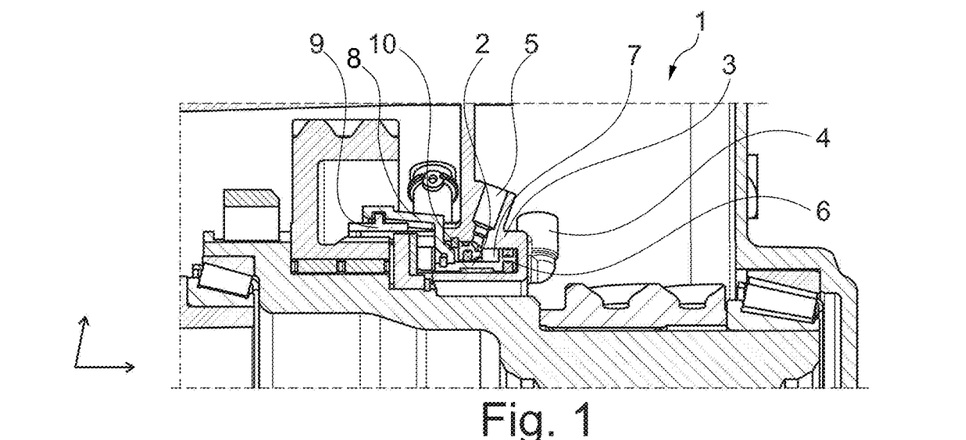
FIG. 1 shows a partially illustrated longitudinal section through a clutch according to the disclosure, wherein the two pressure spaces are located radially outside the piston.
Figure 2:
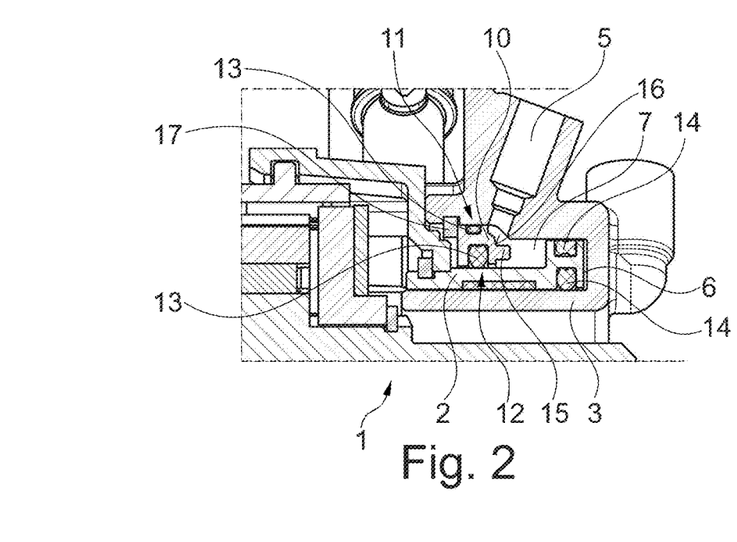
FIG. 2 shows the operating position of the clutch from FIG. 1 with "claw closed"
Figure 3:
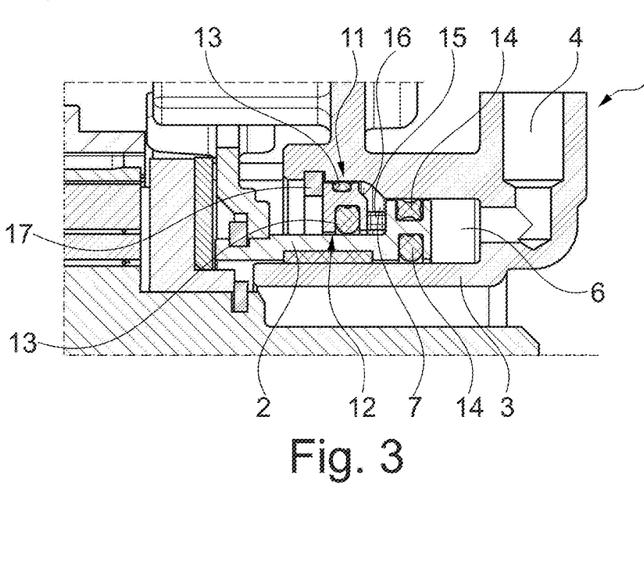
FIG. 3 shows the operating position "claw open" of the clutch of FIGS. 1 and 2.

FIG. 1 shows a clutch 1. It has a piston 2. The piston 2 is designed for bilateral/alternating pressure application. It is arranged in a housing 3. Pressure connections 4 and 5 lead to a first pressure chamber 6 and a second pressure chamber 7 respectively. Reference is made here to FIGS. 2 and 3. The pressure connection 4 leads into the first pressure chamber 6. The pressure connection 5 leads into the second pressure chamber 7. Of course, this can also be achieved vice versa.

An actuating bell 8 is also attached to the piston 2. In the case of the clutch 1 of FIGS. 1 to 3, the piston 2 and the actuating bell 8 are two separate components that are attached to each other. In the case of the clutch 1 of FIGS.

Figure 4:
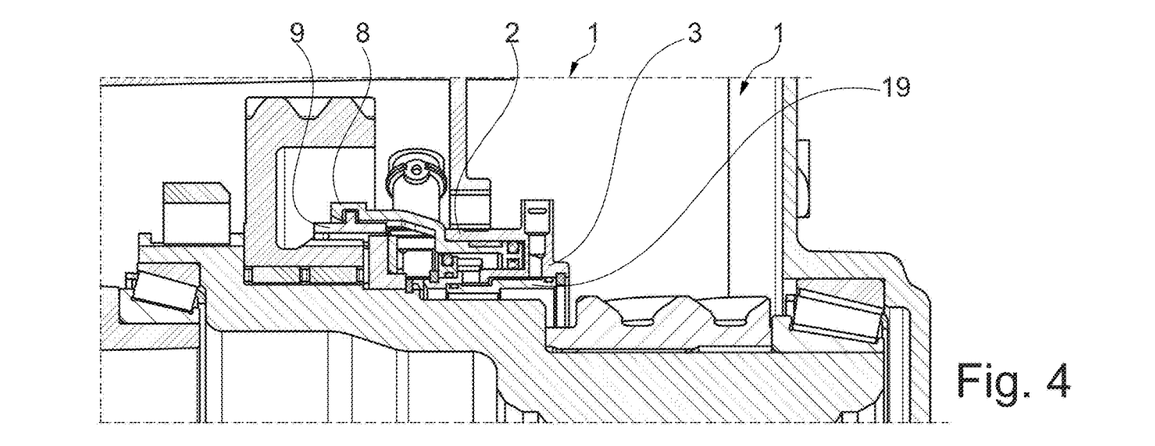
FIG. 4 shows a clutch according to the disclosure, wherein the pressure chambers are located radially inside the piston.
Figure 5:
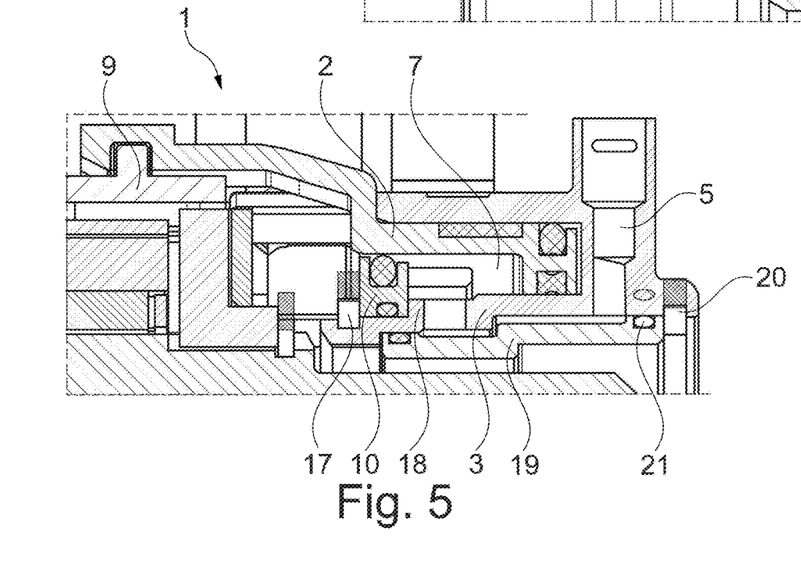
FIGS. 5 and 6 show the operating positions "claw closed" (FIG. 5) and "claw opened" (FIG. 6) of the clutch of FIG. 4.
Figure 6:
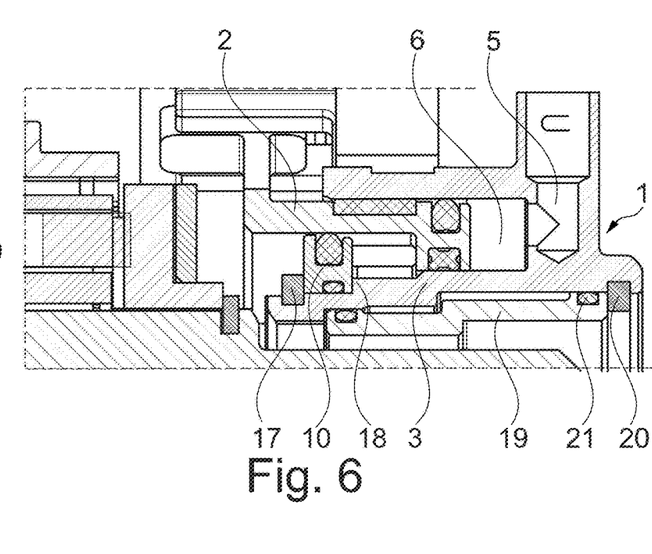

4 to 6, the piston 2 and the actuating bell 8 form an integral, single-material component made in one piece.

The actuating bell 8 engages a sliding sleeve 9. For the clutches 1 of FIGS. 1 to 6 there is also a stop disc/baffle disc 10. The stop disc 10 has a first seat 11 on the radial outside and a second seat 12 on the radial inside.

As can be seen in FIGS. 2 and 3, there is a seal 13 in each of the two seats 11 and 12. These seals 13 seal the pressure chamber 7, i.e., the second pressure chamber. Two further seals 14 seal the first pressure chamber 6. The stop disc 10 has an axial projection 15. In its "claw open" operating position, the axial projection 15 extends completely through the second pressure chamber 7 and rests against the piston 2, as shown in FIG. 3. The axial projection 15 protrudes from an end face 16 of the stop disc 10.

There is a circlip 17 and a step 18 by means of which the stop disc 10 is directly or indirectly fixed about its axial position. This is shown particularly well in FIGS. 5 and 6.

Returning to FIG. 4, attention should be drawn to a pressure space sleeve 19. This pressure space sleeve 19 connects the pressure connection 5 to the second pressure chamber 7. Between the pressure chamber sleeve 19 and the radial inner side of the housing 3, a channel is formed by means of a spacing, whereby the actuating fluid (e.g., oil) is introduced through the pressure connection 5, then through the said channel into the second pressure chamber 7.

The pressure space sleeve 19 is fixed in its position by means of a pressure space sleeve circlip 20 with the interposition of a seal in the manner of an O-ring 21.

Figure 7:
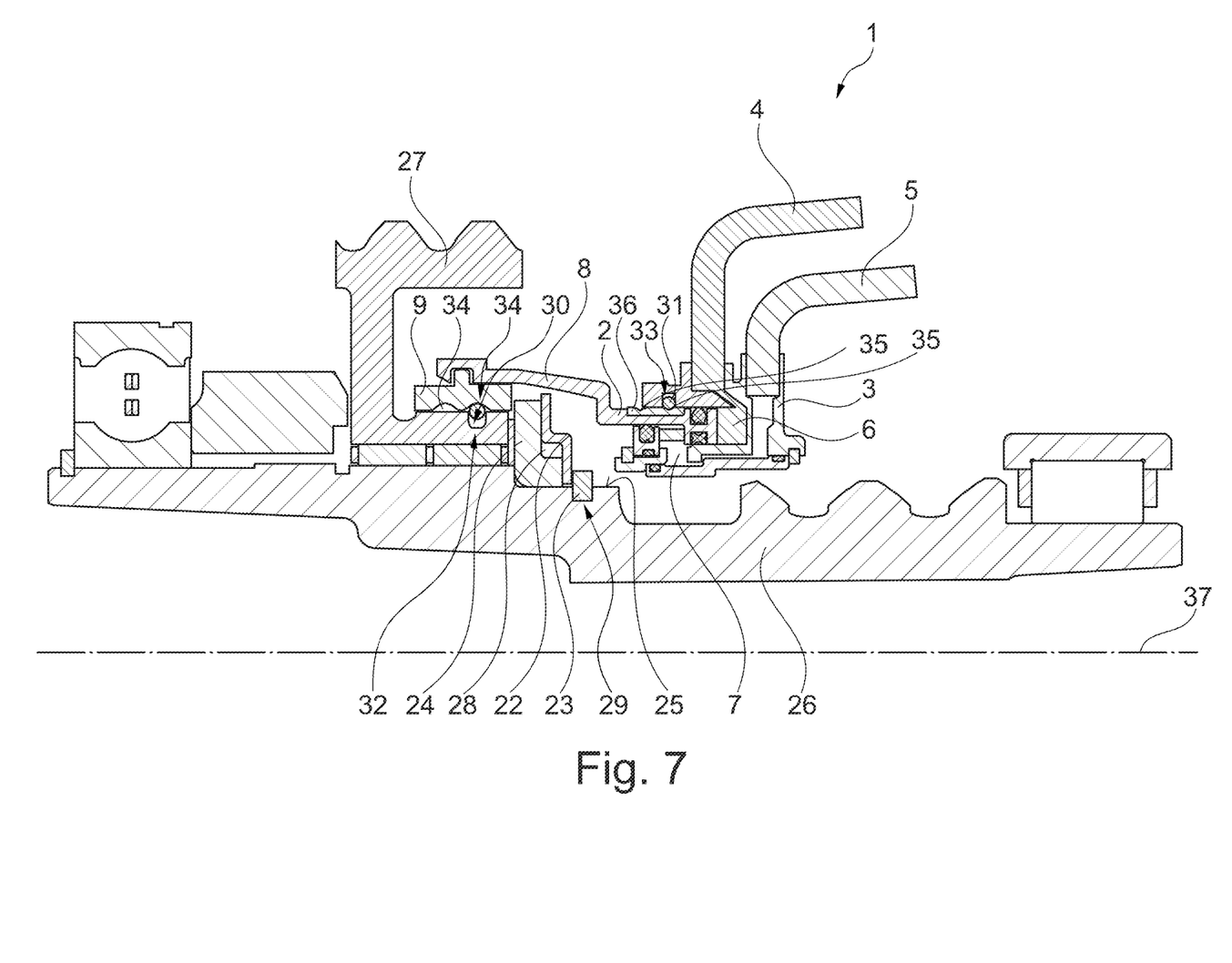
FIG. 7 shows a detail of a longitudinal section through another clutch according to the disclosure in a first operating position, wherein an intermediate shaft with an end stop disc mounted thereon is used as a special feature.

FIG. 7 shows a clutch 1 with an end stop disc 22. This end stop disc 22 is arranged axially between a retaining ring 23 and clutch body 24. These two components are located on a lateral surface 25 of an (intermediate) shaft 26. There is also an idler gear 27.

The end stop disc 22 has an S-shape and is elastic in the axial direction. It is made of sheet metal. An empty space 28 is enclosed between the end stop disc 22 and the clutch body 24. The retaining ring 23 sits in a groove 29 in the lateral surface 25.

There are a variety of locking elements, namely the locking element 30 and the locking element 31. Both the locking element 30 and the locking element 31 are designed as balls. The locking element 30 sits in a locking element receiving groove/groove 32, whereas the locking element 31 sits in a locking element receiving groove/groove 33 in the housing 3. The locking element 30 is intended for locked/locking insertion into channels/grooves 34, whereas the locking element 31 is intended to engage in similar channels/grooves 35 in an insert 36 which is anchored in the piston 2. These channels/grooves 34 and 35 have a beveled surface. The axis of rotation is provided with the reference sign 37.

There are also a pair of bearings on the (intermediate) shaft 26.

Figure 8:
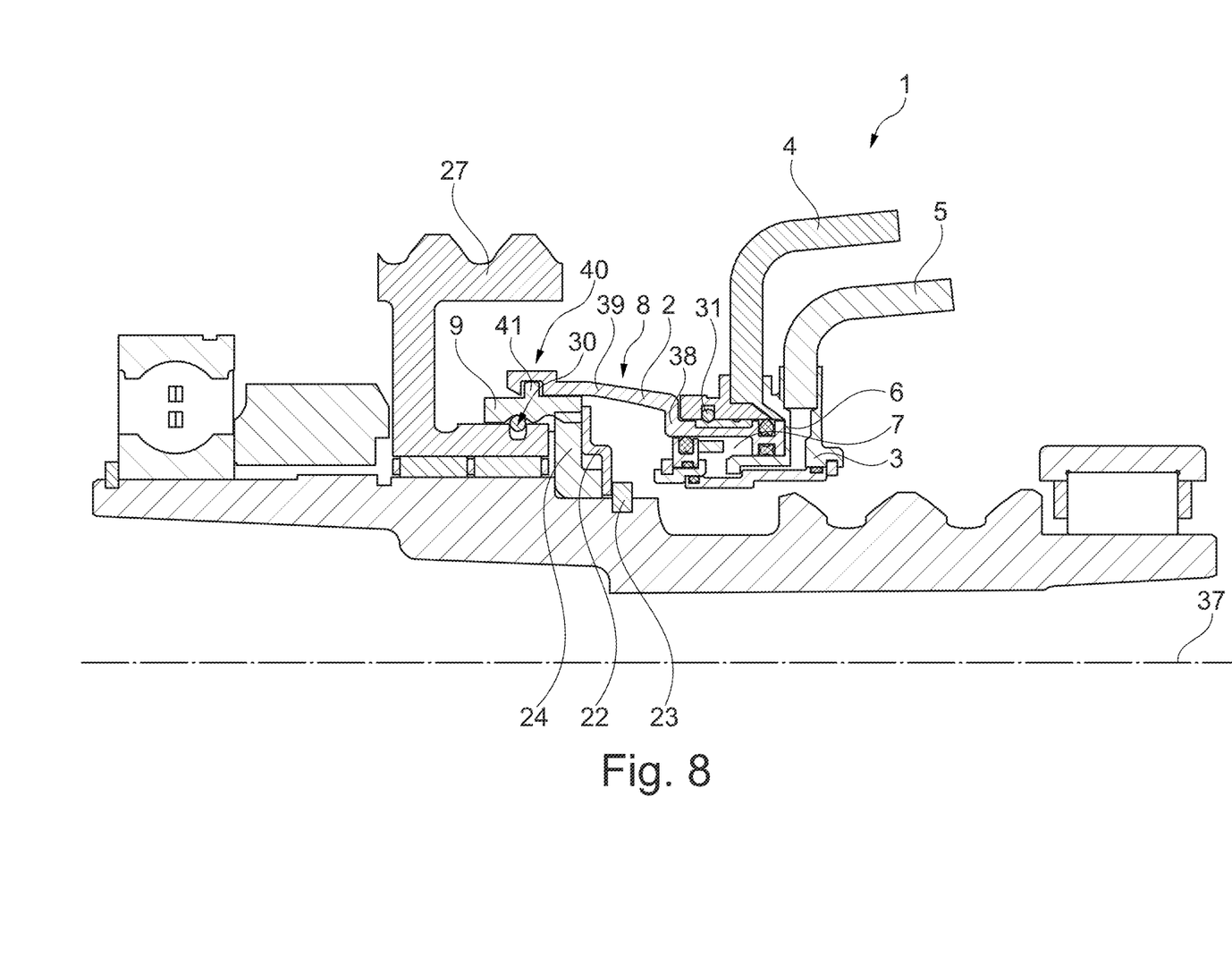
FIG. 8 shows a detail of a longitudinal section through the further clutch according to the disclosure in a second operating position, in which the shift sleeve and the actuating bell are in an axially displaced position relative to FIG. 7, and FIGS. 9 and 10 show the switching position details of the actuating bell, wherein in FIG. 9 a snap closure is shown enlarged in longitudinal section and in FIG. 10 a cantilever-like arm is shown enlarged in perspective.

While one position of the clutch is taken in FIG. 7, the other shifting position of the clutch 1 is taken in FIG. 8.

Figure 9:
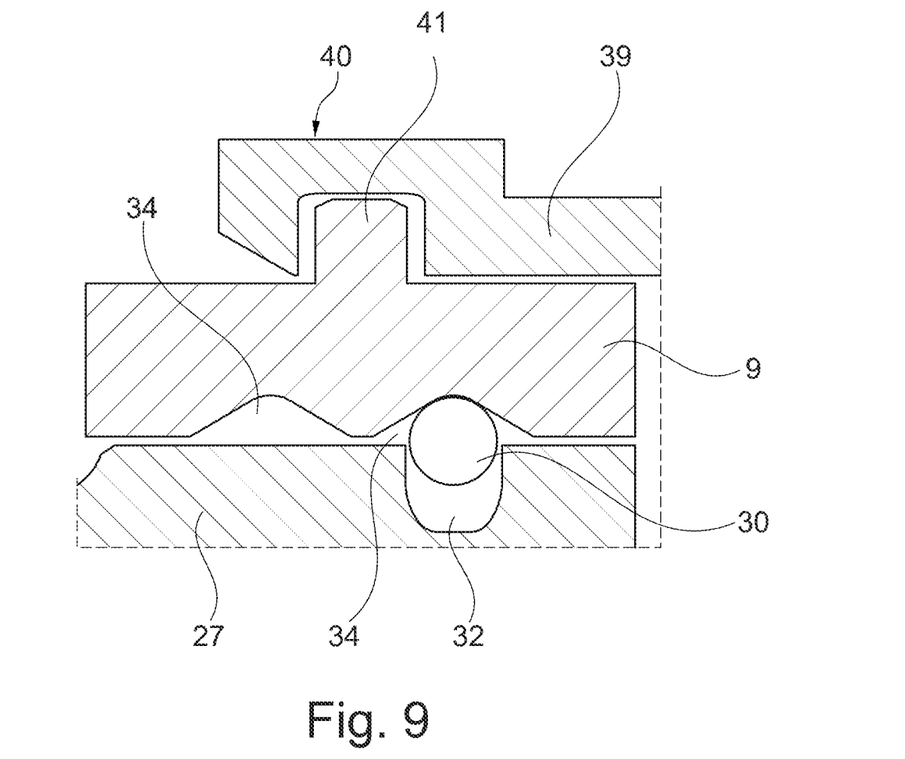

Attention should also be paid again to the design of the actuating bell 8 with a main body 38 which merges into a cantilever-like arm 39 which forms a snap closure 40 at its free end which surrounds a radial projection 41 of the shift sleeve/sliding sleeve with axial clearance. See also FIG. 9.

Figure 10:
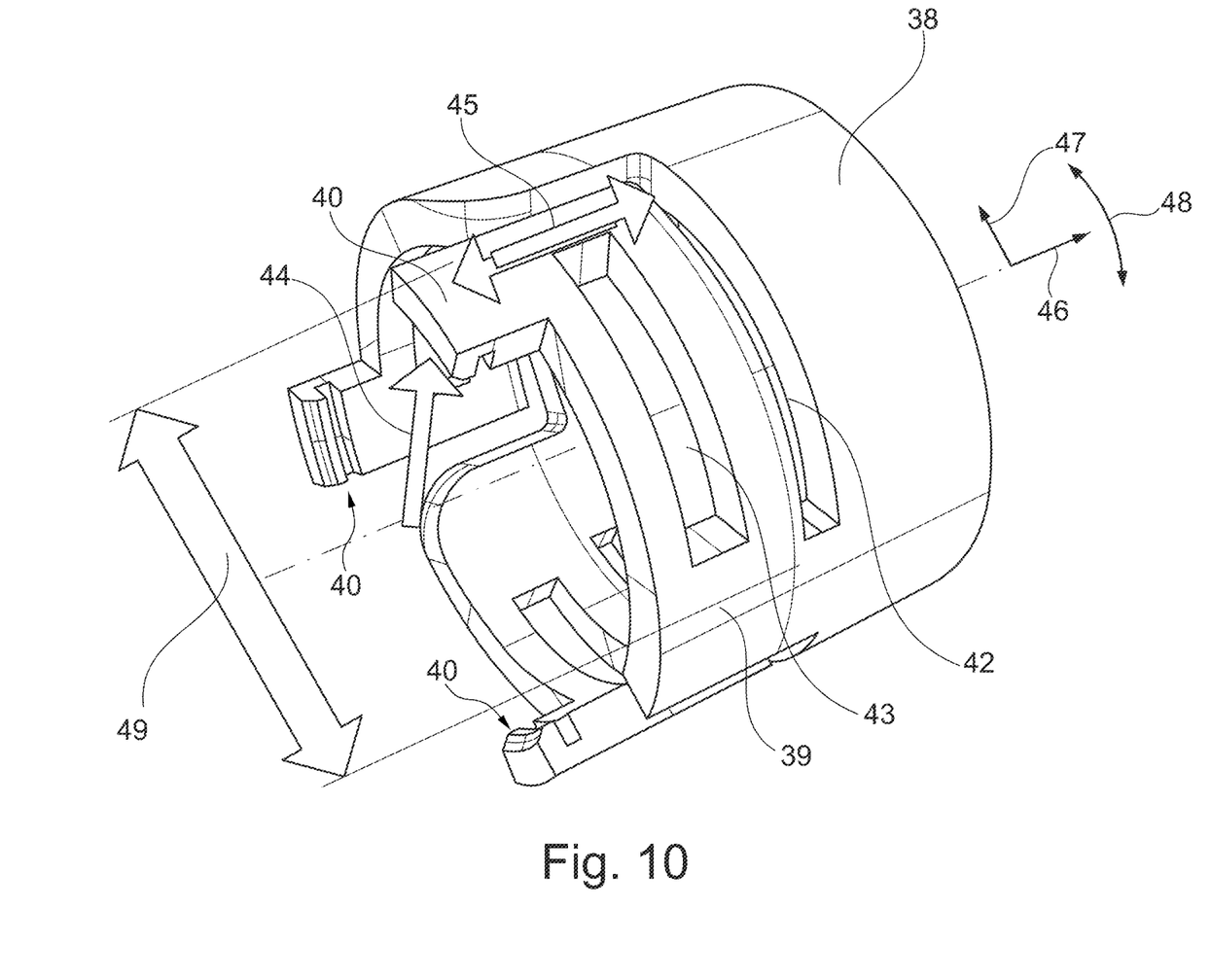

As also indicated in FIG. 10, the snap closure-like end of the cantilever-like arm 39 is designed in the manner of a clip or gripper. There is a slit 42 on the one hand and a slot 43 on the other hand in order to specifically adjust the elasticities/stiffnesses shown with the arrows 44 and 45.

As in FIG. 1, the axial direction is designated with the reference sign 46 and the radial direction is designated with the reference sign 47 in FIG. 10. In FIG. 10, the circumferential direction is indicated by the reference sign 48.

The cantilever-like arm 39 thus represents a lever 49.

REFERENCE NUMERALS

1 Clutch
2 Piston/shifting piston
3 Housing/(shifting) cylinder
4 Pressure connection
5 Pressure connection
6 First pressure chamber
7 Second pressure chamber
8 Actuating bell
9 Sliding sleeve/shift sleeve
10 Stop disc/baffle disc
11 First seat
12 Second seat
13 Seal
14 Seal
15 Axial projection
16 End face
17 Circlip
18 Step
19 Pressure space sleeve
20 Pressure space sleeve circlip
21 O-ring
22 End stop disc
23 Locking ring
24 Clutch body
25 Lateral surface
26 (Intermediate) shaft
27 Idler gear
28 Empty space
29 Groove
30 Locking element
31 Locking element
32 Locking element receiving groove/groove
33 Locking element receiving groove/groove
34 Channel/groove
35 Channel/groove
36 Insert
37 Axis of rotation
38 Main body
39 Cantilever-like arm
40 Snap closure
41 Radial projection
42 Slit/recess
43 Slot
44 Elasticity/stiffness
45 Elasticity/stiffness
46 Axial direction
47 Radial direction
48 Circumferential direction
49 Lever

The invention claimed is:

1. A clutch for coupling a motor to, and decoupling said motor from, a motor vehicle drive train, having a piston which is arranged in a pressure-dependent axially movable manner between two pressure chambers in a housing, wherein the piston is connected to an actuating bell which is designed for contacting or moving a shift sleeve, wherein:

a stop disc is arranged in a one of the two pressure chambers, which limits an axial mobility of the piston; and a plurality of axial projections distributed over a circumference protrude from an end face of the stop disc.

2. The clutch according to claim 1, wherein the stop disc seals the one of the two pressure chambers.

3. The clutch according to claim 1, wherein a seal is inserted in at least one seat of the stop disc.

4. The clutch according to claim 1, wherein:
a seal is arranged between the housing and the stop disc; or
a seal is arranged between the stop disc and the piston.

5. The clutch according to claim 1, wherein the stop disc is arranged radially inside or radially outside the piston.

6. The clutch according to claim 1, wherein the piston is prepared for double-sided or alternating pressurization.

7. The clutch according to claim 1, wherein at least one of the plurality of axial projections which is designed to strike the piston and penetrate one of the pressure chambers.

8. The clutch according to claim 1, wherein a circlip fixed in the housing determines an axial position of the stop disc.

9. The clutch according to claim 1, wherein the shift sleeve is connected to the actuating bell.

10. A clutch for selectively coupling a motor to a motor vehicle drive train, comprising:
a housing comprising a first pressure chamber and a second pressure chamber;
a shift sleeve;
an actuating bell arranged to move the shift sleeve;
a piston connected to the actuating bell and arranged in a pressure-dependent axially movable manner between the first pressure chamber and the second pressure chamber; and
a stop disc arranged in the first pressure chamber or in the second pressure chamber for limiting axial mobility of the piston, the stop disc comprising:
an axial projection arranged to extend through the first pressure chamber or the second pressure chamber and contact the piston; and
an end face, wherein the axial projection is one of a plurality of circumferentially distributed axial projections projecting from the end face.

11. The clutch of claim 10, wherein:
the stop disc is arranged in the first pressure chamber and seals the first pressure chamber; or
the stop disc is arranged in the second pressure chamber and seals the second pressure chamber.

12. The clutch of claim 10 further comprising a seal, wherein:
the stop disc comprises a seat; and
the seal is inserted in the seat.

13. The clutch of claim 12, wherein:
the seal is arranged to seal the stop disc to the housing; or
the seal is arranged to seal the stop disc to the piston.

14. The clutch of claim 10, wherein:
the stop disc is arranged radially inside of the piston; or
the stop disc is arranged radially outside of the piston.

15. The clutch of claim 10 wherein the piston is arranged for alternating pressurization.

16. The clutch of claim 10 further comprising a circlip fixed in the housing and arranged to determine an axial position of the stop disc.

17. The clutch of claim 10 wherein the shift sleeve is connected to the actuating bell.

\* \* \* \* \*